United States Patent
Zhou et al.

(10) Patent No.: US 9,483,965 B2
(45) Date of Patent: Nov. 1, 2016

(54) OPTICAL SHEET FOR GRAPHIC IMAGE DISPLAYS

(75) Inventors: Jian Zhou, Evansville, IN (US); Adel Fawzy Bastawros, Newburgh, IN (US); Michael J. Davis, Mount Vernon, IN (US); David Dean Clinnin, Newburgh, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 326 days.

(21) Appl. No.: 13/440,711

(22) Filed: Apr. 5, 2012

(65) Prior Publication Data
US 2012/0257376 A1 Oct. 11, 2012

Related U.S. Application Data

(60) Provisional application No. 61/473,283, filed on Apr. 8, 2011.

(51) Int. Cl.
| | |
|---|---|
| *G02B 5/02* | (2006.01) |
| *G09F 13/04* | (2006.01) |
| *G02B 5/04* | (2006.01) |
| *G09F 13/08* | (2006.01) |
| *G02B 3/00* | (2006.01) |

(52) U.S. Cl.
CPC ............. *G09F 13/04* (2013.01); *G02B 3/0056* (2013.01); *G02B 5/045* (2013.01); *G09F 13/08* (2013.01)

(58) Field of Classification Search
CPC .. G02B 5/021; G02B 5/0231; G02B 5/0242; G02B 6/0036; G02B 5/02; G02B 3/0043; G02F 1/33555; G02F 1/33606; G02F 1/133555; G02F 1/136063; G09F 13/08

USPC ........................................................ 362/97.1
See application file for complete search history.

(56) References Cited

U.S. PATENT DOCUMENTS

| | | | |
|---|---|---|---|
| 4,111,534 | A | 9/1978 | Cirkler et al. |
| 4,278,736 | A | 7/1981 | Kamerling |
| 5,129,269 | A | 7/1992 | Iizuka et al. |
| 6,144,479 | A | 11/2000 | Lugg et al. |

(Continued)

FOREIGN PATENT DOCUMENTS

CN   201672441 U   12/2010

OTHER PUBLICATIONS

International Search Report; International Application No. PCT/US2012/032380; International Filing Date: Apr. 5, 2012; Mailing Date: Jul. 3, 2012; 4 Pages.

(Continued)

*Primary Examiner* — Nimeshkumar Patel
*Assistant Examiner* — Christopher Raabe
(74) *Attorney, Agent, or Firm* — Cantor Colburn LLP

(57) ABSTRACT

In one embodiment, a graphic image display can comprise: a backlight source; a light transmitting first sheet having a viewing side and a backside, with a plurality of geometric microstructure units on the backside; and a second layer comprising a source of graphic image information. The plurality of geometric microstructure units can be selected from microlenses, polyhedral shapes, lenticular shapes, and combinations comprising at least one of the foregoing. The graphic image display can be suitable for viewing under ambient light from the viewing side alone, under backlighting alone, and in the presence of both ambient light from the viewing side and backlighting.

20 Claims, 9 Drawing Sheets

(56) References Cited

U.S. PATENT DOCUMENTS

| | | |
|---|---|---|
| 2002/0093608 A1 | 7/2002 | Cole et al. |
| 2004/0085749 A1 | 5/2004 | Parker et al. |
| 2006/0290486 A1 | 12/2006 | Sumiya et al. |
| 2008/0266769 A1* | 10/2008 | Massaro ............... H04M 1/22 361/679.23 |
| 2009/0073570 A1 | 3/2009 | Lubart et al. |
| 2009/0219461 A1 | 9/2009 | Zhou et al. |
| 2011/0164321 A1* | 7/2011 | Lee et al. .................. 359/599 |

OTHER PUBLICATIONS

Written Opinion of the International Searching Authority; International Application No. PCT/US2012/032380; International Filing Date: Apr. 5, 2012; Mailing Date: Jul. 3, 2012; 7 Pages.

Machine Translation of CN201672441(U); Date of Publication: Dec. 15, 2010; 16 Pages.

* cited by examiner

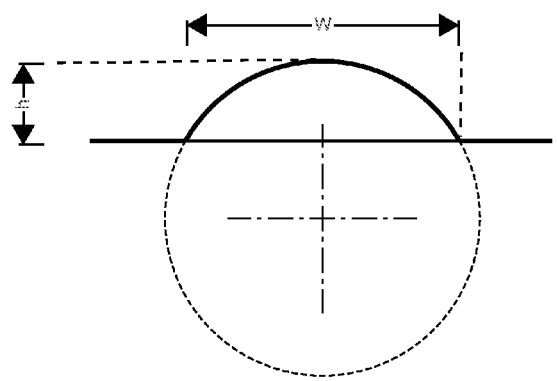
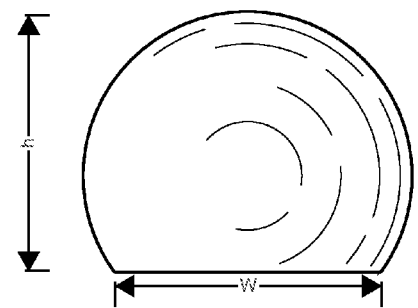
Fig. 3                Fig. 4
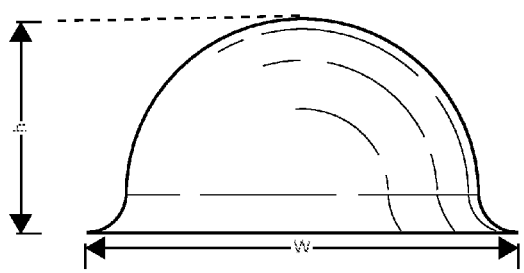
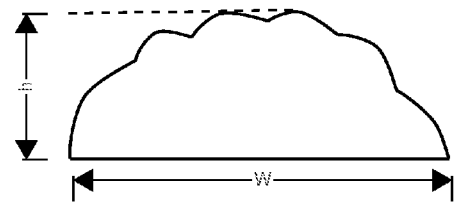
Fig. 5                Fig. 6

OPTICAL SHEET FOR GRAPHIC IMAGE DISPLAYS

CROSS-REFERENCE TO RELATED APPLICATIONS

This application claims priority to U.S. Provisional Application Ser. No. 61/473,283, filed on Apr. 8, 2011, the entire contents of which are incorporated herein by reference.

BACKGROUND

This disclosure generally relates to graphic image displays, and especially relates to graphic image displays lit by both backlight and ambient light.

Graphic image displays that rely on backlighting and/or ambient lighting are used in a variety of applications, such as outdoor commercial posters or signs, warning signs, labels for appliances, or electronic devices instrument clusters, and automotive switches and buttons, etc. The desired characteristics of the graphic image display for optimum performance include good hiding power for the backlight source, high light transmittance, good image contrast, low glare of ambient light, wide or controlled viewing angles, and the durability of the graphic image if it is printed.

In order to provide a uniform intensity profile across the surface of backlit displays, optical sheet(s) with certain levels of light diffusion are used to "spread-out" or diffuse the incident light from the localized backlight sources so that the "bright spots" due to the backlight source are not seen. Such light diffusion capability of the optical sheet, also referred to as hiding power, can be characterized by the haze of the optical sheet. In traditional art, adding diffusing particles to the optical sheet improves hiding power. However, the transmittance of the sheet is reduced due to the addition of diffusing particles.

Another characteristic is the image contrast of the display, i.e., the brightness contrast between the bright and illuminated areas and the surrounding darker areas within the same image. Ambient light is incident on a display from the viewer's side and reflected at the exterior surface of the display. The reflected ambient light is superimposed on the displayed information lit by the backlight source, resulting in a reduced contrast for the viewer. Typically, a light-absorbing ink is used in the image carrying layer to absorb the majority of the ambient light (and the backlight) incident upon the areas surrounding the illuminated window areas of the backlit graphics to improve the image contrast. Moreover, in traditional art, an ink layer that partially reflects and partially transmits the light can be applied only in front of the illuminated window areas of the backlit graphics to partially reflect the ambient light incident upon the window areas in order to further improve the lighting contrast between the window areas and surrounding darker areas in presence of the strong ambient light (e.g., direct sun light). However, the transmittance of the printed graphic image to the incident backlight in the window areas is reduced due to presence of the partially reflecting ink on the surface, which may require increasing the power of the backlight sources to compensate for reduced backlighting brightness when the ambient light is not strong (e.g., during cloudy days), which renders additional cost due to the ink layer itself and the increased power consumption of the backlight sources.

Yet another characteristic of the graphic image display is the viewing angles of the display. For outdoor commercial posters or signs, or warning sign applications, wide viewing angles are generally desired. Adding light diffusing particles into the sheet bearing the graphic image is a traditional way of achieving the wide viewing angles. Again, however, added diffusing particles reduce the transmittance of the backlight and increase the cost.

Thus, there is a need in the industry for the graphic displays with enhanced image contrast and hiding power, i.e., without compromising the transmittance of the backlight for the graphic display. There is also a need to reduce the cost of the display by removing or reducing the amount of the diffusing particles in the optical sheet, and/or removing the above mentioned partially light-reflecting ink layer without sacrificing the overall performance of the graphic display.

BRIEF DESCRIPTION

Disclosed herein are graphic displays and uses thereof.

In one embodiment, a graphic image display can comprise: a backlight source; a light transmitting first sheet having a viewing side and a backside, with a plurality of geometric microstructure units on the backside; and a second layer comprising a source of graphic image information. The plurality of geometric microstructure units can be selected from microlenses, polyhedral shapes, lenticular shapes, and combinations comprising at least one of the foregoing. The graphic image display can be suitable for viewing under ambient light from the viewing side alone, under backlighting alone, and in the presence of both ambient light from the viewing side and backlighting.

In another embodiment, a graphic image display can comprise: a backlight source; a light transmitting first sheet having a viewing side and a backside, with a plurality of geometric microstructure units on the viewing side; and an ink layer, directly onto the viewing side and/or the backside of the first sheet. The ink layer can be in an image-forming pattern that contains a window area through which light can pass and surrounding areas through which light transmission is inhibited or reduced. The plurality of geometric microstructure units selected from microlenses, polyhedral shapes, lenticular shapes, and combinations comprising at least one of the foregoing.

The above described and other features are exemplified by the following figures and detailed description.

BRIEF DESCRIPTION OF THE DRAWINGS

Refer now to the figures, which are exemplary, not limiting, and wherein like numbers are numbered alike.

FIGS. 3 and 4 are spherical (e.g., partial hemispherical) examples of a unit microlens structure.

FIGS. 5 and 6 are nonspherical examples of a unit microlens structure.

DETAILED DESCRIPTION

A graphic image display has at least a first sheet comprising a viewing side and a backside, with one of the sides further comprising a plurality of geometric microstructures. The graphic image display has an ink layer containing a graphic image that has translucent or transparent windows through which light can pass. The ink layer can be directly disposed onto either side of the first sheet or disposed on a second layer that is placed in front of or behind the first sheet with an air gap between the sheets. The said display can provide good image contrast even when exposed to strong ambient light such as sunlight and also provide a combination of both high hiding power and high light transmittance of the backlight if the display uses a backlight source. For the scope of the current invention, graphic refers to any image, text, line drawing or object drawing. The graphic can be of one solid color (e.g., black), different levels of the same color (e.g., grey levels), or of multiple colors and multiple levels of those colors. The graphic may be printed, deposited, laminated, transferred or applied to a surface using any suitable technique.

In one embodiment, a graphic image display can comprise: a backlight source; a light transmitting first sheet having a viewing side and a backside, with a plurality of geometric microstructure units on the backside; and a second sheet or layer comprising a source of graphic image information. The graphic image display can be suitable for viewing under ambient light from the viewing side alone, under backlighting alone, and in the presence of both ambient light from the viewing side and backlighting.

The viewing side can have a flat, e.g., planar surface with no structures, a matte finish, or geometric microstructure units. The first sheet can optionally comprise diffusing particles (e.g., 0.05 wt % to 2 wt %, specifically, 0.05 wt % to 1.5 wt %, and more specifically, 0.1 wt % to 1 wt % diffusing particles, with respect to total weight of the first sheet).

Figure 7A:
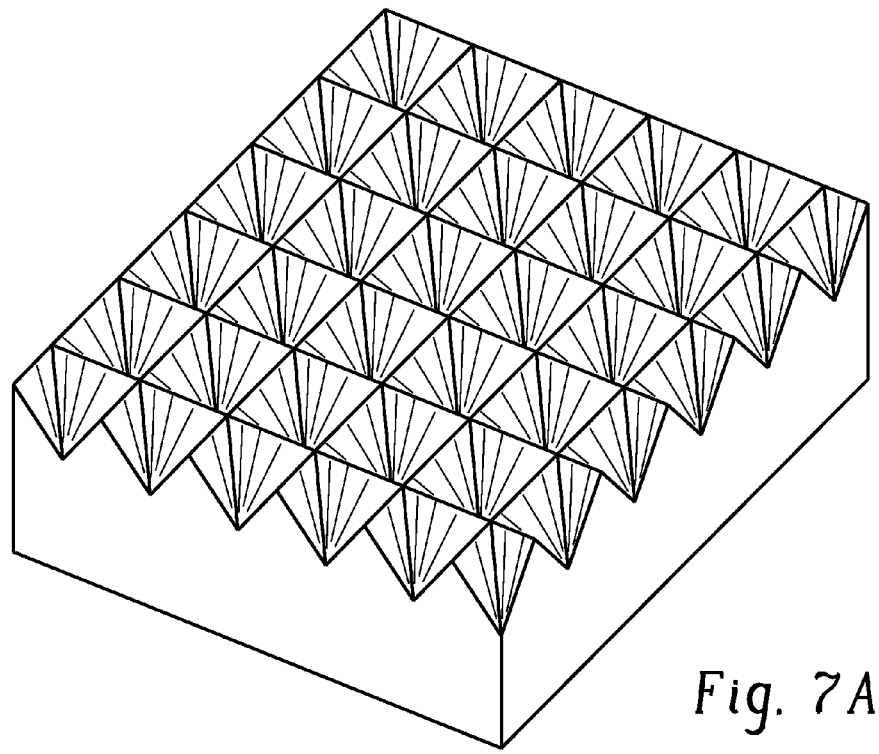
FIG. 7a is schematic illustration of the geometric microstructures containing crossing prismatic shape having sharp ridges.
Figure 7B:
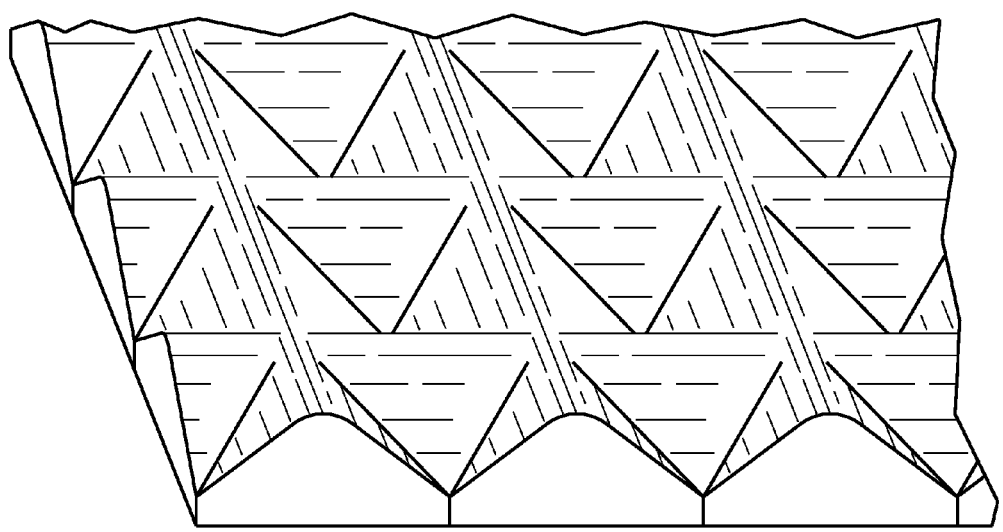
FIG. 7b is schematic illustration of the geometric microstructures containing crossing prismatic shape having rounded ridges.
Figure 8:
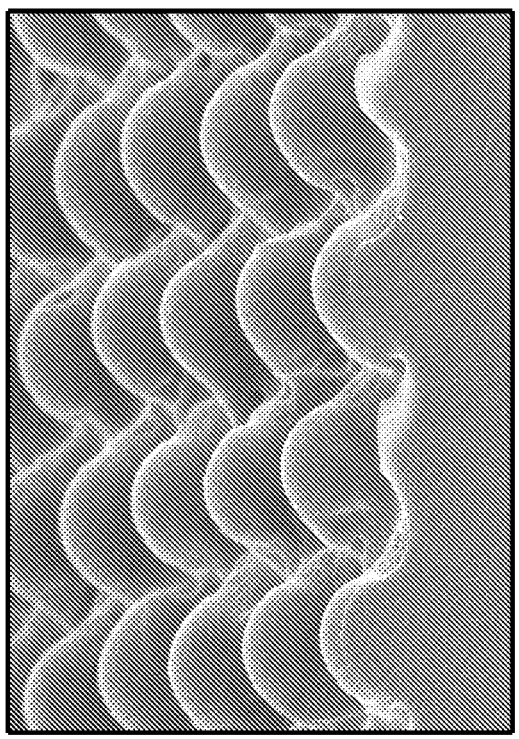
FIG. 8 is an exemplary prospective view of a microlens array with interconnected air channels formed between individual protruding microlenses.

The plurality of geometric microstructure units can be microlenses, polyhedral shapes (e.g., prisms, pyramidal shapes, cube corner shapes, and so forth), lenticular shapes, and combinations comprising at least one of the foregoing. The units can protrude from the sheet surface such as illustrated in FIGS. 1, 2, and 8, or can extend into the sheet surface such as illustrated in FIGS. 7*a* and 7*b* (where disconnected cavities are formed on the sheet surface).

In another embodiment, e.g., wherein the geometric microstructure units can be on the viewing side of the first sheet, and optionally not on the backside (e.g., the backside can be planar (such as a flat, structure-free surface) or can have a matte finish) and a light-absorbing ink layer is printed in an image-forming pattern directly onto either side of the first sheet. The image-forming pattern comprises the window areas through which light can pass, i.e. where the light-absorbing ink is not deposited.

The optical display setup 100 disclosed herein is for graphic image displays to improve lighting effect. Generally, optical sheets have to trade off the transmittance of the light from the backlighting lamps 150 in order to achieve higher reflection or diffusion of the light from the viewer side 45 by including a sufficient quantity of diffusing particles 122 (see FIG. 1). Moreover, adding the diffusing particles into the optical sheet increases cost.

Figure 2:
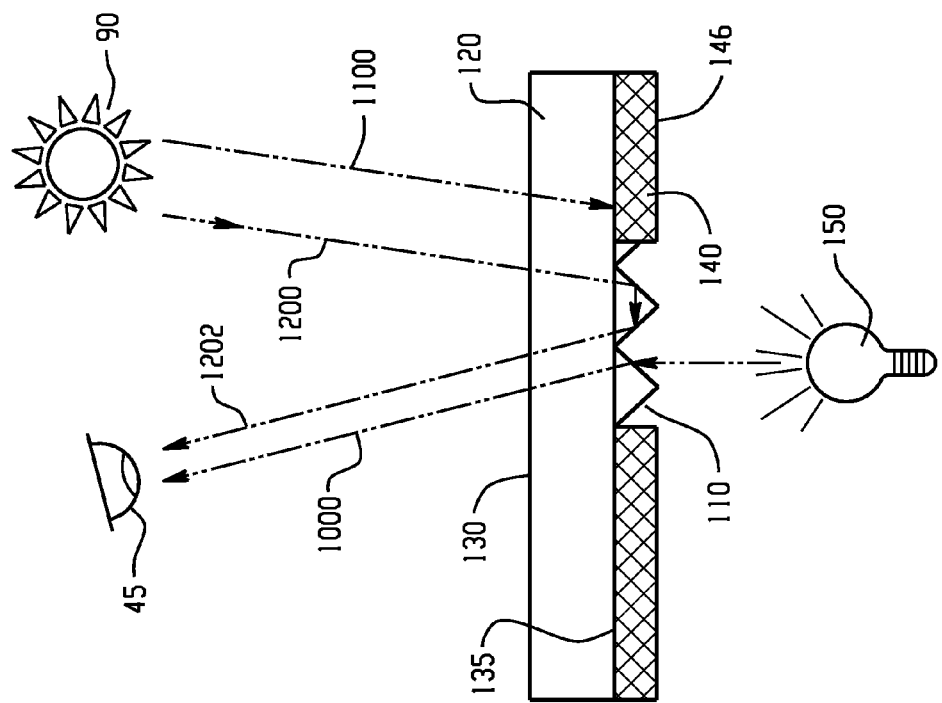
FIG. 2 is a cross-sectional view of an embodiment of a graphic image display.
Figure 1:
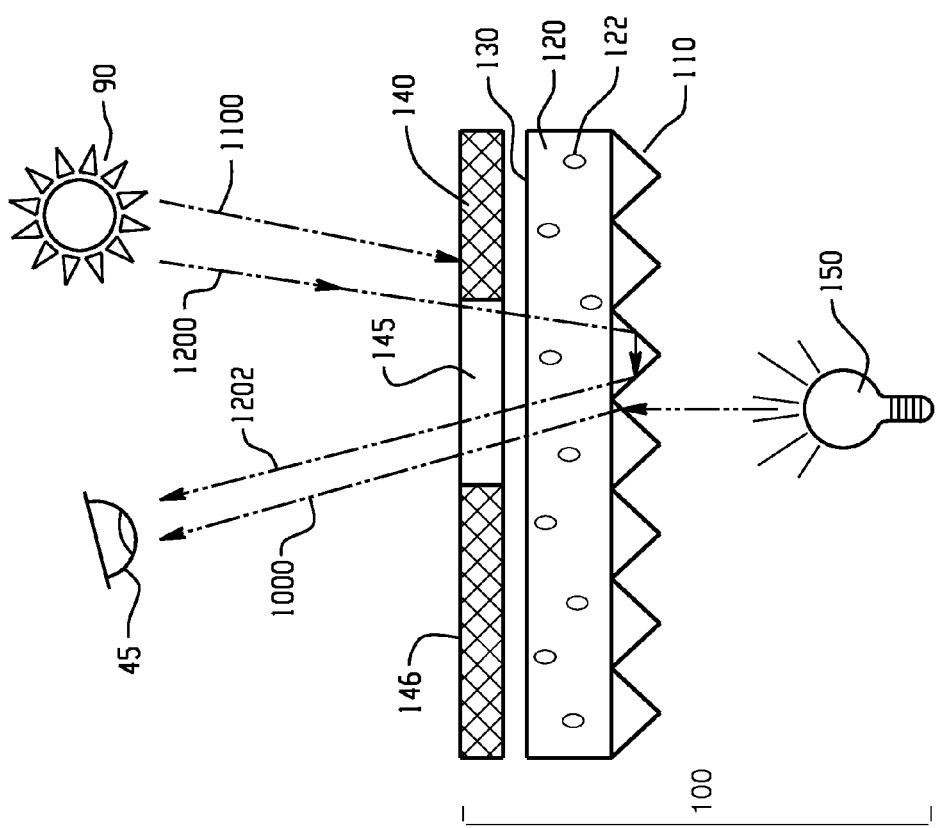
FIG. 1 is a cross-sectional view of an embodiment of a graphic image display.

Referring to FIGS. 1-2, embodiments of the graphic image displays are disclosed. The display has a first sheet 120, a light-transmitting optical sheet, with a micro-structured surface opposite to the viewer, a second layer 140 or an ink layer 140 containing image information disposed adjacent to the first sheet 120, and a backlight source 150 located adjacent to the first sheet 120 on the micro-structured side of the first sheet 120. The second layer or the ink layer 140 can be directly disposed to either side of the sheet 120 or as a separate sheet with a gap to the sheet 120. The graphic image of the sheet 140 has transparent or translucent window areas 145 surrounded by opaque or less light-transmitting portions 146 that prevent or reduce light transmission. For some applications, the haze of the optical sheet 120 can be greater than or equal to 80% (specifically, greater than or equal to 90%, and more specifically, greater than or equal to 95%) to ensure proper diffusion of the backlight source 150, and to prevent optical hot spots. The light source 150 can be an incandescent light source, a fluorescent light source, a light emitting diode (LED) source, or any other source that generates light. The display can also have greater than or equal to 66% transmittance of the incident backlight (specifically, greater than or equal to 80%, and more specifically, greater than or equal to 92%). If the image is susceptible to scratches or exposure to external factors (e.g., chemicals), the design of FIG. 2 is preferable with the ink layer directly printed onto the backside so that the printed image is protected by the substrate of the sheet 120.

The first sheet 120 has a viewing side and a backside facing to the backlight source that has a plurality of geometric microstructures 110. The geometric microstructures 110 can allow greater than about 67% light transmittance of the sheet 120, or even greater than about 80% light transmittance by controlling the path of the light, wherein the light transmittance is in relation to the amount of the light from the bulb transmitted through the sheet. As used herein, haze and light transmittance are measured using a 0.25 mm thick sheet, according to ASTM D1003-00, Procedure A, e.g., using a HAZE-GUARD PLUS from BYK-Gardner, using an integrating sphere (0°/diffuse geometry), wherein the spectral sensitivity conforms to the CIE standard spectral value under standard lamp D65. Reflectance of the optical sheet is measured using an X-Rite Color-Eye 7000A spectrometer with a "diffuse/8°" geometry, wherein the spectral sensitivity conforms to the CIE standard spectral value under a D65 lamp, 10 degree (deg) observer acceptance angle is used and the specular reflectance component is included. In the diffuse/8° geometry, the illumination of the sample surface is diffused lighting and the reflected light at the sample surface is detected at 8° (0.14 radians (rad)) away from the normal axis of the sample surface.

The microstructures 110 affect the optical performance of the sheet 120 by controlling transmittance, reflection, and diffusion of the incident ambient light and backlight. The microstructures 110 can be configured to enhance the image contrast by directing some reflections of ambient light toward the viewer 45 that contains the image information. As shown in FIG. 1, the ambient light ray 1200 incident upon the translucent window areas of the graphic image is reflected back, e.g., by total internal reflection, toward the viewer by the microstructures at the backside of the sheet 120. The ambient light ray 1100 incident upon the surrounding areas of the translucent windows is attenuated dramatically by light absorption. In this case, the image is brightened not only by the transmitted backlight ray 1000 but also the reflected ambient light ray 1202 since the ray 1202 contains the image information. For example, the sheet 140 that has a graphics display window 145 creates the display pattern such as a text message "AC" in an automotive application. The geometric microstructures 110 also allow higher transmittance of the light incident from the backlight source than a comparative sheet without the microstructure but with the same level of the haze that is obtained by adding diffusing particles into the sheet. Further reflection can be obtained by including a reflector in the display so as to reflect light toward the first sheet 120, e.g., located behind the light source 150 on the side away from the viewer. Some rays of the ambient light can transmit through window 145 towards the area of light source 150. It is possible for part of such rays to reflect off the reflector (not shown) behind the light source and eventually exit window 145 in the same manner as rays emitted by the light source itself, thus further increasing the light reaching the viewer.

The individual units of the geometric microstructure 110 that are located on the backside of the optical sheet 120 (i.e., the side facing to the backlight sources) can be any of the following types which include partial spherical or non-spherical microlenses (see FIGS. 3 and 4, 5, and 6, respectively), prisms, crossing prismatic shape (FIGS. 7a and 7b), lenticular shape, pyramidal shapes, corner cubes, cones, as well as other shapes that enable the total internal reflection of some ambient light back to the viewer and also enable the high transmittance of the backlight through the sheet 120, or a combination comprising at least one of the foregoing. Such individual unit geometry can be laid out in a regular or random array in the microstructure 110. If the graphic image is to be printed directly onto the backside of the optical sheet, the microstructured surface that forms interconnected air channels between the individual microstructure units is desirable as it can facilitate the reception of a liquid ink (as an ink example) onto the surface during the printing process. It is further believed that the capillary action of the liquid ink in continuous interconnected air channels helps to improve ink wetting on such microstructured surfaces. Additionally, the similarity in shape and size of neighboring protruding unit microlenses, (e.g., see FIG. 8), creates interconnected air channels that are similar along any two lateral directions of the surface. This leads to uniform or symmetric ink wetting of the printing surface.

In some embodiments, the viewer side of the optical sheet is illustrated as flatter (smoother) than the backside surface (i.e., microstructured surface). The viewer side can be free of any microstructures, or can have a matte (e.g., random) finish, e.g., to prevent directional reflection that results in glare.

Figure 12:
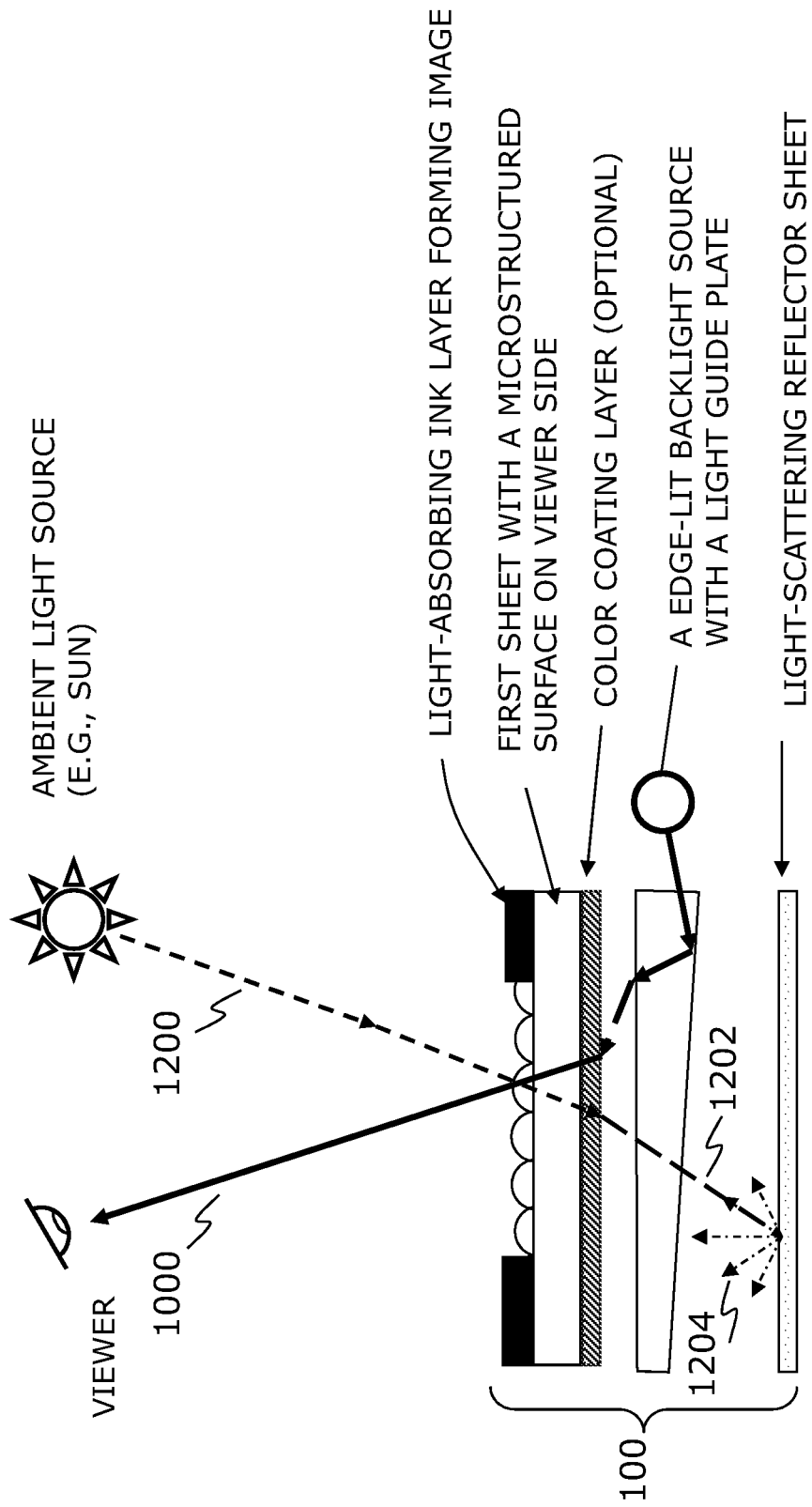
FIG. 12 is a cross-sectional view of an embodiment of an instrument panel display using optical sheet having geometric microstructure units on the viewing side of the first sheet with an ink layer on a portion of the geometric microstructure units, forming a window therethrough and using an edge light.
Figure 13:
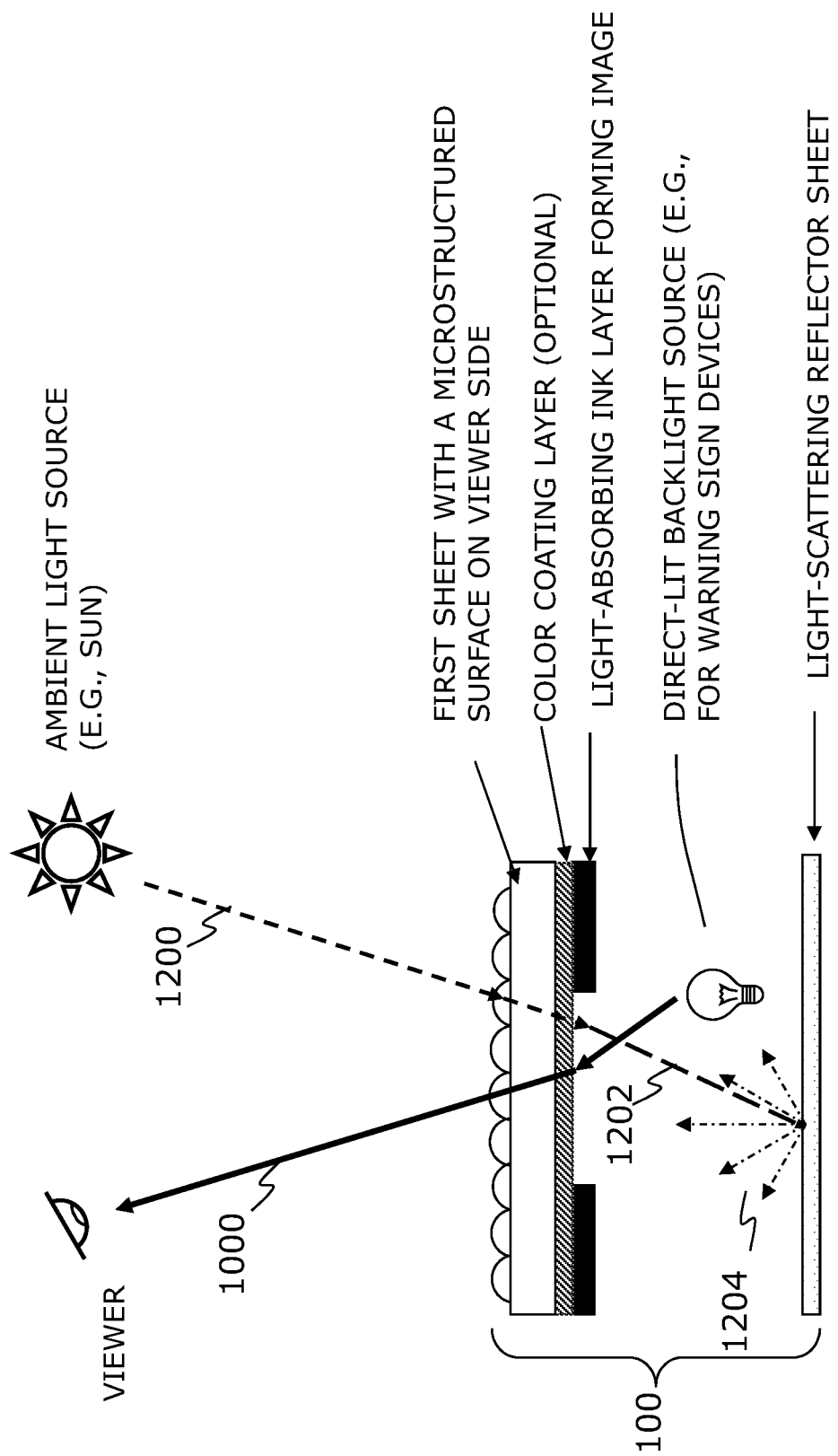
FIG. 13 is a cross-sectional view of another embodiment of an instrument panel display using optical sheet having geometric microstructure units in the viewing side of the first sheet with an ink layer on a portion of the backside, forming a window therethrough.

In other embodiments, the microstructure features can be employed on the viewer side of the sheet wherein the backside of the sheet is flatter (smoother) than the view side or is free of microstructures. The ink layer can be on the viewer side of the sheet (see FIG. 12) and/or on the backside (FIG. 13). FIG. 12 is a cross-sectional view of an embodiment of an instrument panel design (the display) using optical sheet having geometric microstructure units (e.g., a plurality of protruded microlens structures) on the viewing side of the first sheet with the ink layer on a portion of the geometric microstructure units to form a window therethrough. FIG. 13 is a cross-sectional view of another embodiment of an instrument panel display using optical sheet having geometric microstructure units (e.g., a plurality of protruded microlens structures) on the viewing side of the first sheet and with an ink layer on a portion of the surface of the backside. The instrument panel display disclosed herein are more effective in terms of image brightness and hiding-ability of the backlight source features (behind the optical sheet) when compared to an instrument panel display using a sheet having only smooth surfaces or random matte surfaces, when used under either of the following lighting scenarios: 1) presence of only the backlight source but lack of ambient light (e.g., in a dark environment); 2) presence of both the backlight source and the ambient light source.

As disclosed herein, the geometric microstructure on the viewer side of the optical sheet can enhance the brightness, in the viewer's direction, of the backlit image or graphics. Also, the presence of the geometric microstructure on the viewer side enhances the transmission of some rays of the ambient light through the optical sheet towards the light source region. As illustrated in FIGS. 12 and 13, such transmitted ambient light rays 1202 (from original ambient ray 1200) now have the added opportunity to reflect off the light-scattering reflector sheet in the device, forming a fan of scattering ray 1204 which can potentially exit the window area and further increase the light reaching the viewer thus enhancing the brightness of the printed image on the optical sheet.

As can be seen from these figures, other optional sheets can be employed. These sheets, which can be employed individually or in any combination, can also be used with other embodiments set forth herein. The sheets include: anti-reflection coating(s), transparent base sheet(s), light-transmitting color coating layer(s), contrast sheet(s) (e.g., contrast enhancement filter which can be a dyed sheet), and others, as well as combinations comprising at least one of the foregoing.

The width (for lens shape; i.e., the greatest width) or the pitch of the individual unit geometry in the microstructure 110 can be about 5 micrometers to about 10 millimeters (mm), specifically, about 20 micrometers to about 5 mm, and more specifically, about 20 micrometers to about 2 mm. The height/width ratio of the microstructure 110 can be about 0.15 to about 1.0, specifically, about 0.2 to about 1.0, and more specifically, about 0.3 to about 1.0. The plurality of geometric microstructure 110 can be formed either by the same material as the first sheet 120 or formed by a coating of a second polymer onto the surface of the sheet. Optionally, the layer comprising the microstructures can be constructed using alternative techniques such as successive layer deposition similar to that used in rapid prototyping and 3D printing, where the deposited material is of sufficient optical clarity and transparency.

It is noted that for a matte finish the aspect ratio (defined as the height/width ratio of an average surface feature) is typically less than 0.1. A matte finish is inefficient at redirecting reflection of ambient light. In the present embodiments, the aspect ratio of the present geometric shapes is greater than or equal to 0.15, specifically, greater than or equal to 0.2, and more specifically, greater than or equal to 0.3. Not to be limited by theory, it is believed that this is what gives the unit microstructure the ability to refract light towards a common direction (towards the viewer), and enable total internal reflection of a portion of incident ambient light.

Other optional features include additional diffusion, color, and/or low glare, and so forth. Additional diffusion or color effect or wavelength conversion can be attained via light-diffusing particles or color dye or fluorescent dyes in the first sheet or the second sheet, or a third sheet if necessary. For example, the diffusing particles 122 can be integrally mixed into the material of the first sheet during processing. Some possible light diffusing particles include, but are not limited to, titanium dioxide ($TiO_2$), polymethylmethacrylate (PMMA), polystyrene, cross-linked siloxane (e.g., Tospearl particles made by Momentive Performance Materials), as well as combinations comprising at least one of the foregoing. Alternatively, or in addition, a third sheet 135 having a color dye 130 can be positioned between the first sheet 120 and the second layer 140.

In the various embodiments, optionally, a cover layer can be applied to the outermost surface of the graphic image display (that faces toward the viewer), e.g., for scratch resistance and chemical resistance if the display might be exposed to finger touches or cleaning chemicals in the applications. Alternatively, the cover layer can be a polymeric layer with low reflective index or with a front matte surface texture to reduce the glare (i.e., specular reflection) of ambient light at the outermost surface of the display. This portion of the reflected ambient light does not contain the image information and should be reduced to improve the contrast.

The sheets and layers (cover, first, second, third, etc.) can have a combined thickness of about 50 micrometers to about 10 millimeters (mm), and can each be formed from the same or different optically transparent polymeric materials. These materials could include polyalkylenes, polycarbonates (PC), polynorborene, cycloolefin polymer, polyesters, poly(meth)acrylates (i.e., polyacrylates, and polymethacrylates), polyacetals, polystyrene, polyetherimides (PEI), polyurethanes, polyphenylene sulfides, polyvinyl chlorides, polysulfones, polyetherketones, polyether etherketones, polyether ketone ketones, and copolymers or blends or alloys comprising at least one of the foregoing.

The sheet can be a single sheet of a polymeric material having a first side and a second side. As used herein, the terms "diffuse" or "diffusing" are intended to include light scattering or diffusion by reflection, refraction, or diffraction from surface textures, dispersed particles, or sheets or regions of the display film stack.

The composition used in the film sheets can further include various additives that do not have a substantial adverse affect on the desired properties. Possible additives include impact modifiers, fillers, stabilizers (e.g., heat stabilizers, light stabilizers, and so forth), antioxidants, mold release agents, lubricants, flame retardants, anti-drip agents, optical brighteners, and combinations of the foregoing. The additives can be present in an amount effective to impart the desired effect to the display film stack. For example, the additive can be present in an amount of about 0.001 weight percent (wt %) to about 10 wt %, based on a total weight of the particular film.

EXAMPLES

Example 1 (Simulated)

A graphic image display comprises the first sheet 120 that is a polycarbonate sheet with a plurality of geometric microstructures 110 in the form of corner cubes (corner cube array, CCA) on the backside of the sheet that faces to the backlight source of the display. The corner cube array has a hexagonal close-packing mode and the height of a unit corner cube structure is 90 micrometers, with a height/pitch ratio of 0.6. An ink layer (i.e., sheet 140 in this example) containing light absorbent additives is directly printed on the viewing side of the sheet 120 to cover the portion of the viewing side surface. No diffusing particles are added in the polycarbonate matrix of the sheet 120.

Example 2 (Simulated)

Is the same as Example 1 except that the geometrically micro-structured surface of the sheet 120 comprises a plurality of microlens structures with partial spherical shape protruding from the surface (as illustrated in FIG. 3) instead of the CCA unit geometry. The microlens array has a hexagonal close-packing mode and the height of a unit microlens structure is 17 micrometers, with a height/width ratio of 0.45 and the spacing between the neighboring unit microlens is 5 micrometers.

Comparative Example A (Simulated)

Is the same as Example 1 except that the first sheet 120 has a smooth surface on both sides of the sheet 120 and also has 3.5 wt % of titanium dioxide ($TiO_2$), with the refractive index of 2.7, in the bulk phase of the sheet 120 in order to achieve a haze level comparable to that of Examples 1 and 2.

Example 3 (Simulated)

Is the same as Example 2 except that 2 wt % of TiO2, with the refractive index of 2.7, is added into the sheet 120.

Figure 9:
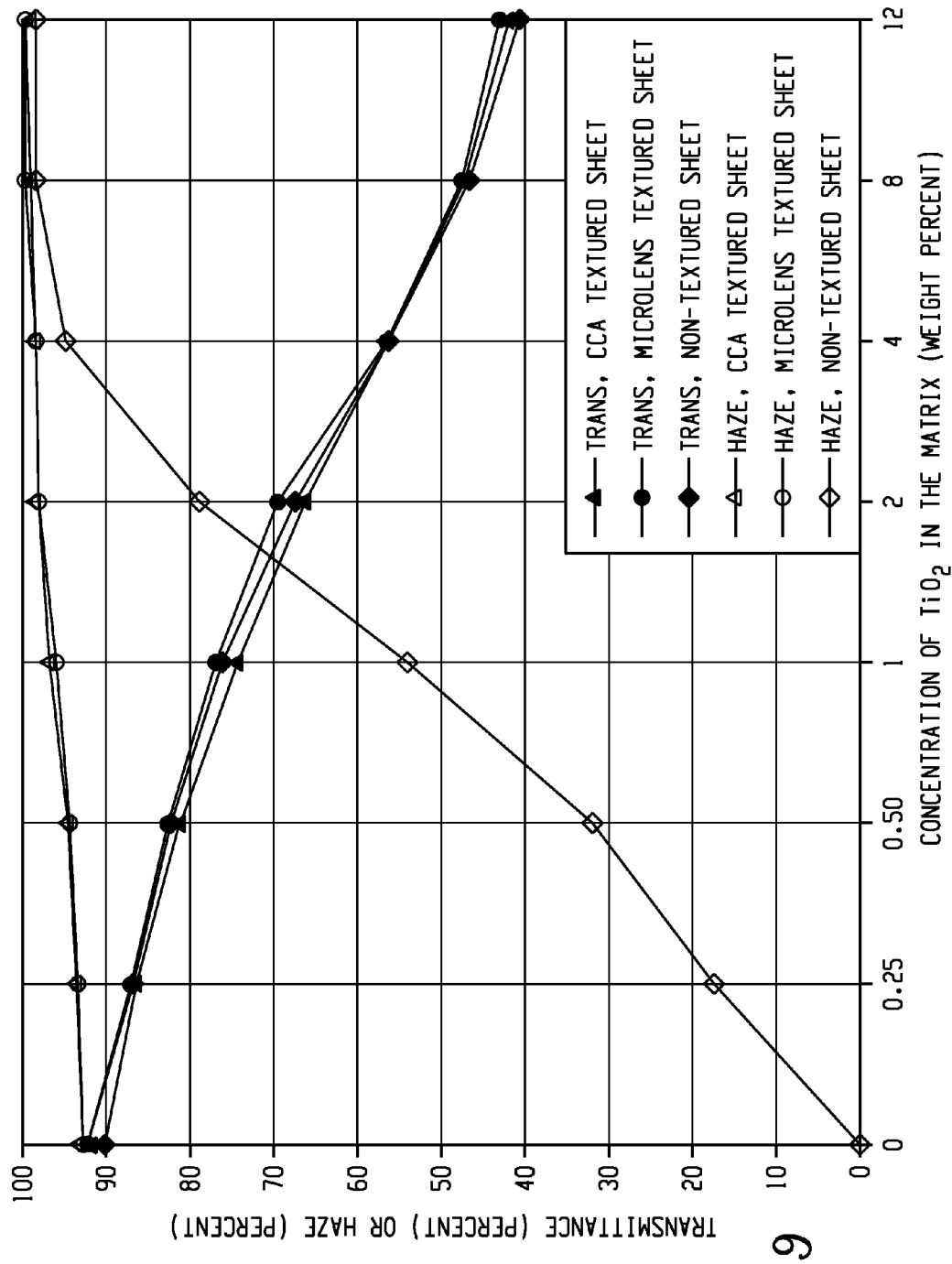
FIG. 9 is a graph of a comparison of transmittance and haze of examples of different optical sheets used for graphic image displays (simulated data).
Figure 10:
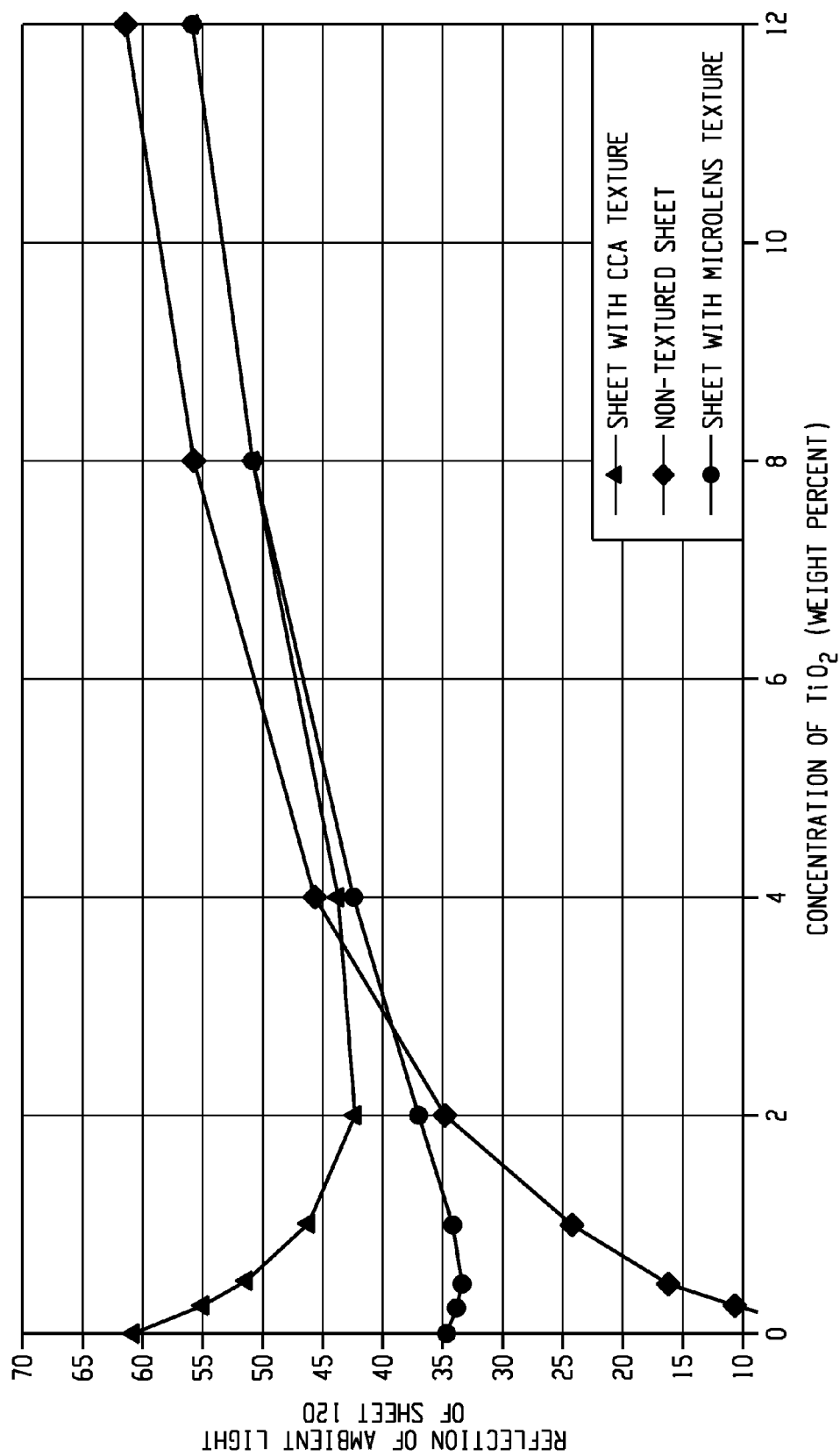
FIG. 10 is a graph comparing ambient light reflectivity of different optical sheets at an angle of incidence of zero degrees (simulated data).
Figure 11:
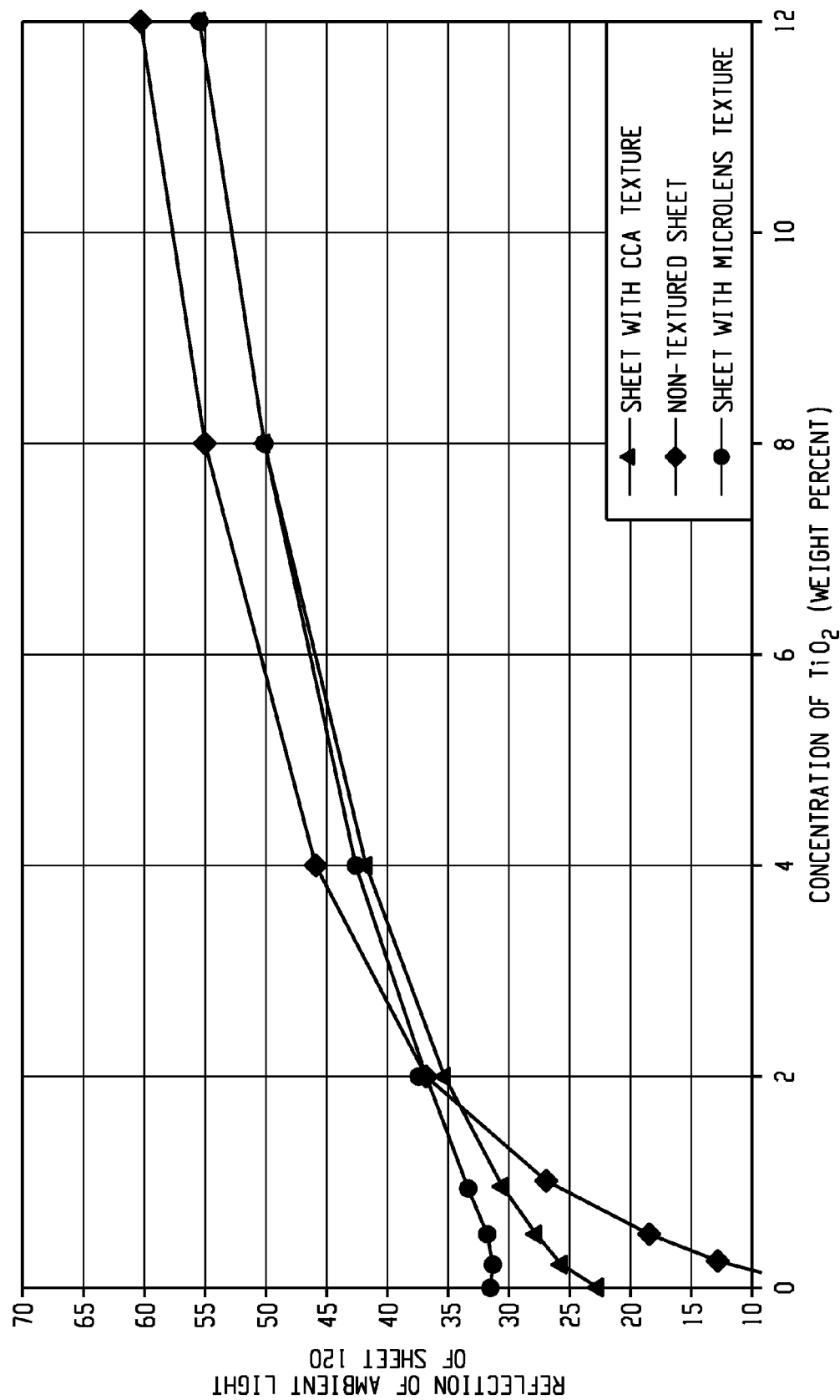
FIG. 11 is a graph comparing ambient light reflectivity of the optical sheets at an angle of incidence of forty-five degrees (simulated data).

Comparison of the simulated optical properties of Examples 1, 2 and Comparative Example A are shown in FIGS. 9, 10, and 11. FIG. 9 is the results of haze and transmittance of the backlight (i.e., light incident upon the backside of the optical sheet facing the light source). FIGS. 10 and 11 are the results of the reflectivity of ambient light incident upon the viewing side of the optical sheet 120 with angle of incidence (AOI) of 0 deg and 45 deg respectively.

TABLE 1

|  | Example 1 | Example 2 | Example 3 | Comparative Example A |
|---|---|---|---|---|
| Concentration of $TiO_2$ particles (wt %)[1] | 0% | 0% | 2% | 3.5% |
| Micro-structured surface of the first sheet | Corner cube array | Microlens array | Microlens array | None |
| Haze | 91% | 92% | 97% | 92% |
| Transmittance of the normally incident backlight | 92% | 92% | 66% | 58% |
| Reflectance of ambient light with AOI[2] of 0 deg | 61% | 35% | 37% | 41% |

TABLE 1-continued

|  | Example 1 | Example 2 | Example 3 | Comparative Example A |
|---|---|---|---|---|
| Reflectance of ambient light with AOI of 45 deg | 23% | 32% | 37% | 40% |

[1]wt % is based upon the total weight of the sheet including the $TiO_2$
[2]AOI = angle of incidence As summarized in Table 1, when compared to Comparative Example A, the optical sheets used in the graphic image displays of Examples 1 and 2 are able to achieve the similar haze level, significantly higher transmittance of light from the backlighting source 150, and comparable or slightly lower reflectivity of the ambient light incident upon the viewing side of the sheet 120. When the graphic image is being illuminated by both transmitted backlight and reflected ambient light, the slightly lower reflectivity of the ambient light can be compensated by the much higher amount of transmitted backlight in the window area 145 for Examples 1 and 2 versus Comparative Example A. So the contrast of the back-lit images can still be better for Examples 1 and 2 than Comparative Example A even in presence of strong ambient light. Since diffusing particles are not necessary in Examples 1 and 2, the cost of making the sheet 120 can be lower than that of Comparative Example A.

Example 4 (Actual)

A graphic image display comprises the first sheet 120 that is a polycarbonate sheet with a plurality of geometric microstructures 110 in the form of corner cubes on the backside of the sheet that faces to the backlight source of the display. The corner cube array has a hexagonal close-packing mode, the height of a unit corner cube structure of 2 millimeters, and the height/pitch ratio of 0.6. A second layer (i.e., sheet 140) comprising a graphic image information is disposed in front of the viewing side of the sheet 120 as shown in FIG. 1. No diffusing particles are added in the polycarbonate matrix of the sheet 120.

Example 5 (Actual)

A graphic image display comprises the first sheet 120 that is a polycarbonate sheet comprising a plurality of protruding non-spherical microlens (as illustrated in FIGS. 5 and 8) on the backside of the sheet, with the average height of the individual microlens of 8 microns, with an average height/width ratio of 0.24, and with the average spacing between the neighboring unit microlens of 9 micrometers. A second layer (i.e., sheet 140) comprising a graphic image information is disposed in front of the viewing side of the sheet 120 as shown in FIG. 1. No diffusing particles are added in the polycarbonate matrix of the sheet 120.

Example 6 (Actual)

Is the same as Example 5 except that the average height of the individual microlens is 16 micrometers, the average height/width ratio is 0.48.

Comparison results of Example 4 through Example 6 are shown in Table 2.

TABLE 2

|  | Example 4 | Example 5 | Example 6 |
|---|---|---|---|
| Concentration of $TiO_2$ particles (wt %)[1] | 0.0% | 0.0% | 0.0% |
| Micro-structured surface of the first sheet | Corner cube array | Microlens array with average height/width of unit lens of 0.24 | Microlens array with average height/width of unit lens of 0.48 |
| Haze | 100% | 97% | 100% |
| Total transmittance of the normally incident backlight | 94% | 91% | 99% |
| Ambient light reflectance measured with diffuse/8° geometry** | 13% | 14% | 43% |

**X-rite ColorEye 7000 A colorimeter with diffuse/8° geometry was used, and the optical sheets of Examples 4 through 6 were oriented with the microstructured side facing away from the incident light during the measurement.

As shown in Table 2, the higher ambient light reflectance (43%) of Example 6 versus Examples 4 and 5 (13% or 14%) means that under a diffused ambient lighting, the reflected ambient light from the optical sheet of Example 6 is more than Examples 4 and 5 along the viewing angle of 8° that is close to the normal axis of the display surface. Example 6 also has the same or better haze and transmittance of the backlight compared to Examples 4 and 5. Therefore, among the three examples of Table 2, Example 6 provides the best lighting contrast (i.e., image contrast) between illuminated areas (window areas 145 in FIG. 1) and the surrounding darker areas (less-light transmitting areas 146 in FIG. 1) when both ambient light and backlight are present.

The graphic displays 100 disclosed herein can be used, for example, for back-lit commercial posters, actuator buttons of automotive panels, indicator signs of instrument clusters, or as appliance labels or barcode labels.

In the displays disclosed herein, the second sheet carrying the image information or the ink layer 140 can be disposed on either or both sides of the optical sheet 120. The ink layer 140 can be any color, with the ink on each side being the same or a different color.

In one embodiment, a graphic image display can comprise: a backlight source; a light transmitting first sheet having a viewing side and a backside, with a plurality of geometric microstructure units on the backside; and a second layer comprising a source of graphic image information. The plurality of geometric microstructure units can be selected from microlenses, polyhedral shapes (e.g., prisms (such as crossing prismatic shape), pyramidal shapes, and corner cube shapes), lenticular shapes, and combinations comprising at least one of the foregoing. The packing mode of individual microstructure units on the surface can be regular (e.g., patterned) or random. The graphic image display can be suitable for viewing under ambient light from the viewing side alone, under backlighting alone, and in the presence of both ambient light from the viewing side and backlighting. The graphic display of this embodiment is also suitable for the applications requiring wide viewing angles.

In another embodiment, a graphic image display can comprise: a backlight source; a light transmitting first sheet having a viewing side and a backside, with a plurality of geometric microstructure units on the viewing side; and a second layer or layer comprising a source of graphic image information directly disposed onto either side of the first sheet. The plurality of geometric microstructure units can be selected from microlenses, polyhedral shapes, lenticular shapes, and combinations comprising at least one of the foregoing.

In another embodiment, a graphic image display can comprise: a backlight source; a light transmitting first sheet having a viewing side and a backside, with a plurality of geometric microstructure units on the back side; and an ink layer directly onto a surface of either or both sides of the first sheet (directly on the viewing side and/or directly on the backside), wherein the ink layer forms a window through which light can pass, and wherein the ink layer can carry image information. The plurality of geometric microstructure units is selected from microlenses, polyhedral shapes, lenticular shapes, and combinations comprising at least one of the foregoing. The graphic image display can be suitable for viewing under backlighting alone and in the presence of both ambient light from the viewing side and backlighting. The graphic display described herein is also suitable for the applications requiring optimum brightness of the back-lit image along the normal viewing axis of the display.

In another embodiment, a graphic image display can comprise: a backlight source; a light transmitting first sheet having a viewing side and a backside, with a plurality of geometric microstructure units on the viewing side; and an ink layer directly onto the viewing side and/or the backside of the first sheet. The ink layer can be in an image-forming pattern that contains a window area through which light can pass and surrounding areas through which light transmission is inhibited or reduced.

In the various embodiments, (i) the haze of the first sheet is greater than or equal to 95% as is measured in accordance with according to ASTM D1003-00, Procedure A (e.g., at a plaque thickness of 0.25 mm); and/or (ii) the second layer is an ink layer directly on (e.g., directly printed on) either or both sides of the first sheet; and/or (iii) the plurality of geometric microstructure units form discontinuous cavities into the backside (e.g., the surface of the backside), and wherein the ink layer is printed onto the backside (e.g., the surface of the backside); and/or (iv) the plurality of geometric microstructure units comprise microlenses; and/or (v) the plurality of geometric microstructure units are polyhedral; and/or (vi) the microstructure units have a pitch or average width of about 5 micrometers to 10 mm; and/or (vii) further comprising diffusing particles in the first sheet or the second layer; and/or (viii) the display comprises no diffusing particles; and/or (ix) the plurality of geometric microstructure units is selected from microlenses and lenticular shapes, and combinations comprising at least one of the foregoing; and/or (x) the microstructures have a height/width ratio of 0.15 to 1.0; and/or (xi) the height/width ratio is 0.3 to 1.0; and/or (xii) the microstructure units can protrude from the surface of the first sheet or the microstructure units can extend into the surface of the first sheet forming a cavity therein (e.g., a discontinuous cavity); and/or (xiii) an outermost surface of the display on a side of the display opposite the backlight source has an anti-reflection layer and/or a random matte surface texture; and/or (xiv) the plurality of geometric microstructure units comprise polyhedron shapes; and/or (xv) the plurality of geometric microstructure units form interconnected air channels between the individual microstructure units, and wherein the ink layer is printed onto the portion of the microstructure units; and/or (xvi) the ink layer is on the viewing side; and/or (xvii) the second layer can be directly (e.g. directly created or printed on) on the first sheet (e.g., viewing side and/or the backside) in an image-forming pattern that contains a window area through which light can pass and surrounding areas through which light transmission is inhibited or reduced; and/or (xviii) wherein the ink layer is directly on a portion of the geometric microstructure units, and wherein the portion is greater than or equal to 50% of the surface of the sheet comprising the ink layer; and/or (xix) wherein the ink layer is directly on a portion of the geometric microstructure units, and wherein the portion is greater than or equal to 75% of the surface of the sheet comprising the ink layer; and/or (xx) wherein the ink layer is directly on a portion of the geometric microstructure units, and wherein the portion is greater than or equal to 80% of the surface of the sheet comprising the ink layer; and/or (xxi) the first sheet and/or the second layer further comprise diffusing particles; and/or (xxii) where an outermost surface of the display on the viewing side has an anti-reflection layer and/or a random matte surface texture; and/or (xxiv) wherein the second layer is directly on a surface on the viewing side.

The displays disclosed herein employ the optical sheet with the microstructure on its backside surface to enhance the lighting contrast of the printed graphics (between the inked area 146 and the window area 145 (i.e., the non-inked area)), and increase the hiding power of the optical sheet to the backlight sources.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the embodiments has been described with reference to exemplary embodiments, it will be understood by those skilled in the art that various changes may be made and equivalents may be substituted for elements thereof without departing from the scope of the concept of the embodiments. In addition, many modifications may be made to adapt a particular situation or material to the teachings of the embodiments without departing from essential scope thereof. Therefore, it is intended that the scope not be limited to the particular embodiment disclosed as the best mode contemplated for carrying out this the claims, but that the scope will include all embodiments falling within the appended claims.

What is claimed is:

1. A graphic image display comprising:
   a backlight source;
   a light transmitting first sheet having a viewing side and a backside, with a plurality of geometric microstructure units forming a microstructured surface; and
   a second layer comprising a source of graphic image information;
   wherein the plurality of geometric microstructure units is selected from microlenses, polyhedral shapes, lenticular shapes, and combinations comprising at least one of the forgoing; wherein the graphic image display is suitable for viewing under ambient light from the viewing side alone, under backlighting alone, and in the presence of both ambient light from the viewing side and backlighting; and
   wherein the plurality of geometric microstructure units form interconnected air channels between the individual microstructure units, wherein the air channels are similar along any two lateral dimensions, and wherein an ink layer is printed onto the portion of the microstructured surface.

2. The display of claim 1, wherein the plurality of geometric microstructure units are on the viewing side of the first sheet.

3. The display of claim 1, wherein the plurality of geometric microstructure units are on the back side of the first sheet.

4. The display of claim 3, wherein the second layer is the ink layer directly on the first sheet in an image-forming pattern that contains a window area through which light can pass and surrounding areas through which light transmission is inhibited or reduced.

5. The display of claim 1, wherein the second layer is an ink layer directly on the first sheet in an image-forming pattern that contains a window area through which light can pass and surrounding areas through which light transmission is inhibited or reduced.

6. The display of claim 1, wherein the second layer is a second sheet placed in front of or behind the first sheet.

7. The display of claim 1, wherein the microstructure units protrude from the first sheet.

8. The display of claim 1, wherein the microstructure units forms cavities into the first sheet.

9. The display of claim 1, wherein the haze of the first sheet is greater than or equal to 95% as is measured in accordance with according to ASTM D1003-00, Procedure A.

10. The display of claim 1, wherein the microstructure units have an average width of about 5 micrometers to 10 mm.

11. The display of claim 1, further comprising diffusing particles mixed into the material of the first sheet and/or the second layer.

12. The display of claim 1, wherein the microstructures have a height/width ratio of 0.15 to 1.0.

13. The display of claim 12, wherein the microstructure is a plurality of microlenses with a height/width ratio of 0.3 to 1.0.

14. The display of claim 1, where an outermost surface of the display on the viewing side has an anti-reflection layer and/or a random matte surface texture.

15. A graphic image display comprising:
    a backlight source;
    a light transmitting first sheet having a viewing side and a backside, with a plurality of geometric microstructure units forming a microstructured surface; and
    a second layer comprising a source of graphic image information;
    wherein the plurality of geometric microstructure units is selected from polyhedral shapes, prisms, crossing prismatic shapes, pyramidal shapes, corner cubes, cones, or a combination comprising at least one of the forgoing;
    wherein the graphic image display is suitable for viewing under ambient light from the viewing side alone, under backlighting alone, and in the presence of both ambient light from the viewing side and backlighting; and
    wherein the plurality of geometric microstructure units form interconnected air channels between the individual microstructure units, wherein the air channels are similar along any two lateral dimensions, and wherein an ink layer is printed onto a portion of the microstructured surface.

16. The display of claim 1, wherein a sample of the display having a thickness of 0.25 mm exhibits a transmittance of the incident backlight of greater than or equal to 66% as determined according to ASTM D1003-00, Procedure A, using a standard lamp D65.

17. The graphic image display of claim 1, wherein the interconnected air channels facilitate reception the ink layer onto the microstructured surface during a printing process.

18. The graphic image display of claim 1, wherein capillary action of a liquid ink in the interconnected air channels helps to improve ink wetting of the ink layer on the microstructured surface.

19. The graphic image display of claim 1, wherein individual neighboring microstructure units of the plurality of geometric microstructure units comprise similar shape and size, and wherein the interconnected air channels allow the ink layer to wet the microstructured surface uniformly and/or symmetrically.

20. A graphic image display comprising:
    a backlight source;
    a light transmitting first sheet having a viewing side and a backside, with a plurality of geometric microstructure units forming a microstructured surface, wherein an average height of the individual microstructure units is less than or equal to 16 micrometers and an average height/width ratio is 0.48;
    a second layer comprising a source of graphic image information;
    wherein the plurality of geometric microstructure units is selected from microlenses, polyhedral shapes, lenticular shapes, and combinations comprising at least one of the forgoing;
    wherein the graphic image display is suitable for viewing under ambient light from the viewing side alone, under backlighting alone, and in the presence of both ambient light from the viewing side and backlighting; and
    wherein the plurality of geometric microstructure units form interconnected air channels between the individual microstructure units, wherein the air channels are similar along any two lateral dimensions, and wherein an ink layer is printed onto the portion of the microstructured surface.

* * * * *